United States Patent

[11] 3,617,426

| [72] | Inventor | Roger V. Grundman |
| | | Roseville, Minn. |
| [21] | Appl. No. | 805,422 |
| [22] | Filed | Mar. 10, 1969 |
| [45] | Patented | Nov. 2, 1971 |
| [73] | Assignee | Minnesota Mining and Manufacturing Company |
| | | St. Paul, Minn. |

[54] TORQUE-TRANSMITTING MEMBER
6 Claims, 5 Drawing Figs.

[52] U.S. Cl.................................................. 161/42,
161/64, 161/67, 188/251, 192/107
[51] Int. Cl.......................................................... F16d 3/00
[50] Field of Search........................................... 161/62, 63,
64, 67, 42; 15/28, 180; 192/107, 107 M; 188/251, 251 A

[56] References Cited
UNITED STATES PATENTS

| 3,386,122 | 6/1968 | Mathison.................. | 15/230.17 |
| 3,434,577 | 3/1969 | Mathison.................. | 192/107 M |
| 3,143,895 | 8/1964 | Robie....................... | 74/107 X |
| 2,424,873 | 7/1947 | Abbrecht................... | 74/191 |
| 2,941,410 | 6/1960 | Ota........................... | 161/63 X |
| 2,563,259 | 8/1951 | Miller....................... | 117/9 |
| 3,275,487 | 9/1966 | Lemelson................. | 156/72 |

*Primary Examiner*—Robert F. Burnett
*Assistant Examiner*—Raymond O. Linker, Jr.
*Attorney*—Kinney, Alexander, Sell, Steldt & Delahunt

ABSTRACT: A torque-transmitting member in which a plurality of short stiff normally straight fibers are secured to and randomly spaced on a planar surface of a flexible backing. Each fiber has one end secured to the planar surface and extends therefrom at an acute angle less than about 45° and generally perpendicular to a radial line on the planar surface intersecting the secured end of the fiber.

PATENTED NOV 2 1971 3,617,426

INVENTOR.
ROGER V. GRUNDMAN
BY Kinney, Alexander,
Sell, Steldt & DeLa Hunt
ATTORNEYS

TORQUE-TRANSMITTING MEMBER

This invention relates to an improved torque-transmitting number in which short stiff normally straight fibers extend from a planar surface of a flexible backing in a circular pattern about a single common axis through and perpendicular to the planar surface of the backing.

Torque transmission devices of the prior art have generally been formed with contacting friction surfaces one of which is metal and precision ground for alignment with the other surface. More recently it has been discovered that torque may be transmitted between two surfaces through fibers which extend from the surfaces and intermesh. Such devices eliminate the need for precision alignment of the parts. Thus, in U.S. Pat. Nos. 2,424,873 and 2,941,410 there are illustrated devices in which torque may be transmitted from a driving member to a driven member through normally straight intermeshing fibers. In each of these devices, however, the fibers extend from at least one of the members perpendicular to its axis of rotation and a major portion of the fibers are, at any time, disengaged and unavailable for transmitting torque. Since the amount of torque which may be transmitted is dependent on the number of fibers which are intermeshed at any one time, the efficiency of these devices is undesirably limited. More efficient utilization of fibers has been made by the use of driving and driven members having facing planar surfaces perpendicular to their axis of rotation where the fibers extend from the facing surfaces and intermesh. However, until now, to prevent the fibers from brushing past one another which would permit undesired relative rotation of the driving and driven members, it was necessary that the fibers be nearly absolutely rigid or that they interlock as the "hook" and "pile" fabric of U.S. Pat. No. 3,143,895. Therefore, the types of fibers which could be used were unduly limited or the fibers were required to be specially formed in a fabric. Furthermore, in all of the aforementioned devices the fibers remain intermeshed when the driving and driven members are rotated in either direction about their axes and, therefore, they may not be used in a unidirectional drive such as that required in a starter clutch of an internal combustion engine.

It is therefore an object of the present invention to provide a torque-transmitting member in which normally straight fibers extend from a flexible backing in a circular pattern, which member may be efficiently utilized to transfer torque between facing torque transmission surfaces. It is a further object to provide a torque-transmitting members which may be utilized to form torque transmission device in which normally straight fibers intermesh only when the members are rotated in one direction.

The novel features and advantages of the present invention will become apparent after reading the following description which refers to the accompanying drawing wherein.

Figure 1:
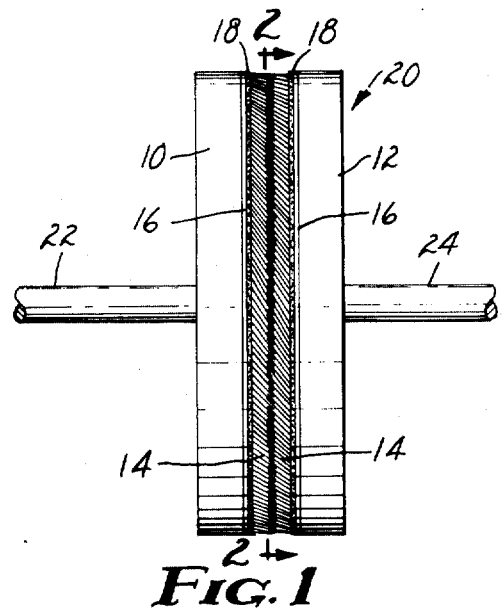
FIG. 1 is a longitudinal view of a torque-transmitting device made in accordance with the present invention used as a clutch.
Figure 3:
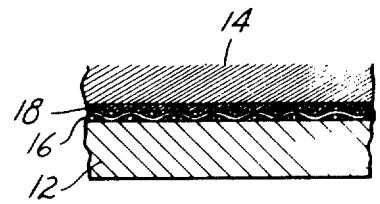
FIG. 3 is an enlarged transverse sectional view taken along line 3—3 of FIG. 2.
Figure 2:
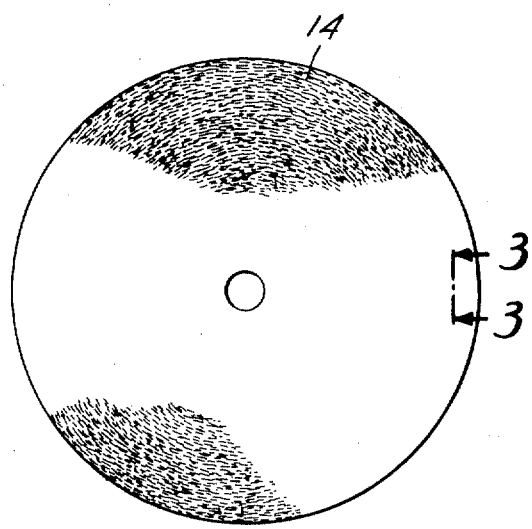
FIG. 2 is a plan view taken along line 2—2 of FIG. 1.

The torque-transmitting device of the present invention comprises a pair of supported members 10 and 12 having facing parallel planar surfaces and a plurality of stiff normally straight short fibers 14.

The supported members 10 and 12 are preferably disk shaped and are similarly formed of a rigid material such as a metal or a rigid plastic with a flexible fabric backing 16 of uniform thickness having a pair of opposed normally planar surfaces, such as an open web cotton fabric, supporting the fibers which are bonded thereto, and the backings are secured to and covering the facing planar surfaces of the support members. These members 10 and 12 are supported coaxially with their facing planar surfaces normally spaced such that their common axis is centrally perpendicular to their facing planar surfaces.

The fibers 14 may be manufactured of synthetic, semisynthetic, regenerated or natural fibers. It is preferred to use nylon of about 10–500 denier per filament and a length of about 1–10 mm. In a single embodiment fibers of similar denier and length are randomly spaced on opposed portions of the facing planar surfaces of the supported members 10 and 12. Each fiber 14 has one end secured to one of the facing planar surfaces of supported member 10 and 12 preferably by being embedded in an adhesive layer 18 which covers the exposed face of the flexible fabric backing 16. As is diagrammatically illustrated in FIG. 4, each fiber 14 is secured to extend from a planar surface of a supported member 10 or 12 and, thereby, a planar surface of the associated fabric backing 16 at an acute angle of less than 45° and perpendicular to a straight line on the planar surface intersecting the secured end of the fiber 14 and the common axis of the supported members 10 and 12. Thus, in the illustrated embodiments the fibers 14 extend from the planar surfaces each perpendicular to a radius of the disk-shaped supported member 10 or 12 to which it is secured.

Figure 4:
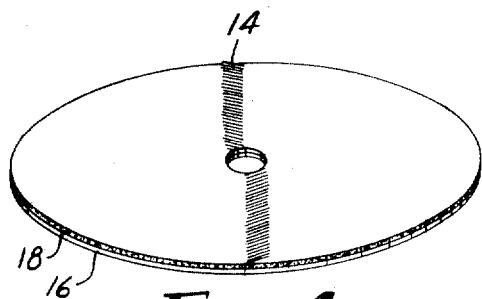
FIG. 4 is a perspective view of the surface of FIG. 2 with a majority of the fibers removed to illustrate the general arrangement of the fibers.
Figure 5:
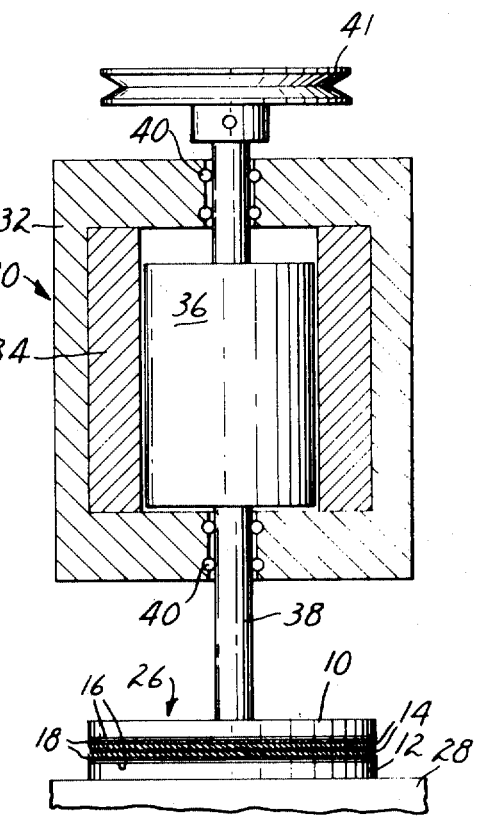
FIG. 5 is a transverse view partially in section of the present invention used as a motor brake.

Preferably all of the fibers 14 secured to one of the planar surfaces extend therefrom in a single circular direction about the common axis of the associated supported member 10 or 12, as illustrated in FIG. 4, and the fibers on opposed planar surfaces extend in opposite circular directions as illustrated in FIG. 1 and 5. Thus, when the supported members 10 and 12 are positioned as illustrated in FIGS. 1 and 5 and one of the members is driven in the same circular direction as the fibers extend from its planar surface the fibers intermesh with the fibers extending from the opposed surface. Because the fibers extend from the facing planar surfaces at an acute angle less that 45°, this rotation of one of the members causes the fibers extending from one surface to be driven toward the secured ends of the fibers extending from the other surface and the supported members 10 and 12 are drawn closer together by a self-energizing effect. The free ends of the fibers 14 extending from each of the opposed planar surfaces are then trapped between the other opposed planar surface and the secured ends of the fibers extending from the other opposed planar surface, thereby increasing the effect of the coupling and the torque transmitting capacity. In accordance with the present invention, where bidirectional torque transmission may be desirable, the fibers on each of the planar surfaces may also extend therefrom in both circular directions about the common axis of the supported member 10 and 12 so long as the fibers on opposed concentric portions of the facing planar surfaces extend in opposite circular directions. Thus, by positioning the fibers in concentric circular strips about the common axis, with the fibers in adjacent strips on each member extending in opposite circular directions and with the fibers on opposed concentric portions of the surfaces also extending in opposite circular directions, portions of the fibers extending from the surfaces will intermesh in each direction of rotation.

Referring now to FIG. 1, there is illustrated a unidirectional clutch, generally designated 20, utilizing the present invention. The disk shaped members 10 and 12 are respectively supported on rotatably supported shafts 22 and 24 which extend oppositely perpendicular from the nonfacing surfaces and coaxially with the common axis of the members 10 and 12. AS aforementioned the fibers extend from each of the planar surfaces in a single circular direction. Upon driving one of the members 10 through its shaft 22 or 24 in the same circular direction as the fibers extend from its planar surface the fibers extending from the facing surfaces intermesh as aforedescribed to drive the other member in the same circular direction. However, when the driving member 10 is rotated in a circular direction opposite that in which the fibers extend from its planar surface the fibers extending from the opposed surfaces are disengaged, and likewise if the driven member 12 moves in the same circular direction faster than the driving member the fibers become disengaged, thereby permitting relative rotation of the members 10 and 12. This device may, therefore, be used as a starter clutch in an internal combustion engine as, for instance, the type used on lawn mowers. Although the fibers are disengaged upon the aforementioned relative rotation of the members there will be frictional contact of the fibers which may cause deterioration of the fibers especially at high relative rotational velocities. It is therefore preferable that means be provided for moving one of the members 10 or 12 axially away from the other member, upon relative rotation of the members, a distance sufficient to prevent contact of the fibers.

Referring now to FIG. 5 there is illustrated a unidirectional motor brake, generally designated 26, illustrating a second use of the present invention. One of the disk-shaped members 12 has its fiber free planar surface secured to a fixed surface 28, and the other or upper disk-shaped member 10 is secured by its fiber free planar surface to one end of a drive shaft 38 of an electric motor 30 coaxially with the shaft 38. The electric motor has a housing 32, a stator 34, a rotor 36 having a lesser length than the stator 34, and a drive shaft 38 coaxially supporting the rotor 36. The drive shaft 38 is supported at the ends of the housing 32 by bearings 40 which permit free rotation and axial movement of the drive shaft 38, the rotor 36 and the member 10 with respect to the housing. the housing 32 is supported in spaced relationship to the surface 28 such that the drive shaft 38 and the disk-shaped member 10 secured thereto are coaxial with the disk-shaped member 12 and the fibers 14 extending from the planar surfaces of members 10 and 12 are in contact when the motor is not operating. A gear or pulley 41 which may drive a chain or belt (not shown) to transfer torque upon energization of the motor 30 is secured to the drive shaft 38 on the end opposite the member 10. In this device the fibers 14 on the member 10 secured to the drive shaft 38 are positioned to extend therefrom in the same circular direction as the rotor 36 turns upon energization of the motor 30 or counterclockwise as viewed from above the motor in FIG. 5. The fibers on the fixed member 12 are then positioned to extend therefrom in the opposite circular direction or clockwise. Upon energization of the motor 30 the magnetic field set upon the stator 34 immediately pulls the rotor away from the member 12 to center the rotor in the stator thereby moving the drive shaft 38 and the member 10 secured thereto axially to separate the fibers 14 extending from the planar surfaces. The rotor 36, the drive shaft 38, the pulley 41 and the upper member 10 then rotate counterclockwise so long as the motor 30 is energized. Upon deenergization of the motor, the magnetic field in the stator is curtailed but the rotor, being freely rotatable, continues to rotate. Curtailment of the magnetic field in the stator 34, however, permits the rotor 36 to almost immediately move toward its normal position engaging the fibers on member 10 with the fibers on member 12. The fibers 14 extending from member 10 intermesh with the fibers 14 extending from the fixed member 12 as aforedescribed to immediately brake the continued rotation of the rotor 36 in the driven direction.

Where a load is being moved by the motor 30 it is often advantageous to brake the motor against reverse rotation when the motor is deenergized. This would prevent the load from dropping whenever the motor is deenergized. In such an application the fibers on the member 10 would extend in the opposite direction to the direction of rotation of the rotor and the fibers on the stationary member would extend counterclockwise from its face.

In a preferred embodiment of the present invention a substantial portion of the individual fibers extend from the surface at an angle of between 15° and 45° and the fibers are nylon, 3.80 mm. (0.150 inch) long and 50 denier, and coated on said surface at a density of about 8,000 fibers per square inch (1,250 fibers per square centimeter.)

Having thus described the present invention, what is claimed is:

Having thus described the present invention what is claimed is:

1. A torque-transmitting member comprising:
   a flexible fabric backing of uniform thickness having a pair of opposed normally planar surfaces, and
   a plurality of short stiff normally straight fibers adhesively secured to and randomly spaced on one of said normally planar surfaces of said flexible fabric backing, each said fiber having one end adhesively secured to said one surface and extending therefrom at an acute angle less than about 45° and each said fiber being generally perpendicular to a straight line on said surface intersecting said secured end and a single common axis through and perpendicular to said surface, with said fibers extending generally equal distances from said one surface.

2. The torque-transmitting member of claim 1 including a rigid member having at least one planar surface to which is secured the planar surface of said flexible backing opposite said one surface thereof.

3. The torque-transmitting member of claim 1 wherein each said fiber is between about 10 and about 500 denier and has a length between about 1 mm. and about 10 mm.

4. The torque-transmitting member of claim 3 wherein a majority of said fibers extend from said one planar surface of said flexible backing at an acute angle greater than about 15°.

5. The torque-transmitting member of claim 1 wherein said flexible backing is disk shaped with its axis coincident with said axis about which said fibers are secured.

6. The torque-transmitting member of claim 1 wherein said fibers extend from said one planar surface in a single circular direction about said common axis.

* * * * *